US010914920B2

(12) United States Patent
Bian et al.

(10) Patent No.: US 10,914,920 B2
(45) Date of Patent: *Feb. 9, 2021

(54) CAMERA OPTICAL LENS

(71) Applicant: AAC Optics Solutions Pte. Ltd., Singapore (SG)

(72) Inventors: Xuqi Bian, Shenzhen (CN); Lei Zhang, Shenzhen (CN); Yanmei Wang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,982

(22) Filed: Dec. 28, 2017

(65) Prior Publication Data

US 2019/0121083 A1    Apr. 25, 2019

(30) Foreign Application Priority Data

Oct. 19, 2017 (CN) .......................... 2017 1 0975249
Oct. 19, 2017 (CN) .......................... 2017 1 0975251

(51) Int. Cl.
*G02B 13/00* (2006.01)
*G02B 9/64* (2006.01)
*G02B 1/04* (2006.01)

(52) U.S. Cl.
CPC ......... *G02B 13/0045* (2013.01); *G02B 1/041* (2013.01); *G02B 9/64* (2013.01)

(58) Field of Classification Search
CPC .................. G02B 3/04; G02B 9/00–64; G02B 13/002–0045; G02B 13/18
USPC .................................................. 359/708–718
See application file for complete search history.

(56) References Cited

U.S. PATENT DOCUMENTS

| 4,264,137 A * | 4/1981 | Fujii ...................... G02B 13/04 |
| | | 359/750 |
| 4,818,081 A * | 4/1989 | Ito ......................... G02B 15/142 |
| | | 359/692 |
| 5,381,270 A * | 1/1995 | Cho ...................... G02B 15/142 |
| | | 359/692 |
| 5,675,440 A * | 10/1997 | Kanamori .............. G02B 15/16 |
| | | 359/686 |
| 5,999,338 A * | 12/1999 | Nagahara ............... G02B 13/06 |
| | | 359/717 |
| 10,274,701 B1 * | 4/2019 | Fang .................. G02B 27/0025 |
| 10,310,232 B2 * | 6/2019 | Zhao ......................... G02B 9/64 |
| 10,310,233 B1 * | 6/2019 | Chen ........................ G02B 9/64 |
| 10,330,896 B2 * | 6/2019 | Bian ........................ G02B 9/64 |
| 10,451,847 B2 * | 10/2019 | Zhao ........................ G02B 9/64 |
| 10,488,621 B2 * | 11/2019 | Zhao ........................ G02B 9/64 |
| 10,641,992 B2 * | 5/2020 | Chen ...................... G02B 1/041 |
| 2015/0103414 A1 * | 4/2015 | Baik ................. G02B 13/0045 |
| | | 359/708 |

(Continued)

OTHER PUBLICATIONS

Lohmann, Adolf, "Scaling Laws for Lens Systems," Applied Optics, vol. 28, No. 23, pp. 4996-4998. (Year: 1989).*

*Primary Examiner* — Nicholas R. Pasko
(74) *Attorney, Agent, or Firm* — IPro, PLLC; Na Xu

(57) ABSTRACT

The present application discloses a camera optical lens. The camera optical lens including, in an order from an object side to an image side, a first lens, a second lens, a third lens, a fourth lens, a fifth lens, a sixth lens and a seventh lens. The camera optical lens further satisfies specific conditions.

11 Claims, 9 Drawing Sheets

(56) References Cited

U.S. PATENT DOCUMENTS

2016/0085055 A1* 3/2016 Asami .................... G02B 13/04
                                                        359/755
2019/0227270 A1* 7/2019 Zhao ........................ G02B 9/64

* cited by examiner

CAMERA OPTICAL LENS

CROSS-REFERENCE TO RELATED APPLICATIONS

This application claims the priority benefit of Chinese Patent Applications Ser. No. 201710975249.8 and Ser. No. 201710975251.5 filed on Oct. 19, 2017, the entire content of which is incorporated herein by reference.

FIELD OF THE PRESENT DISCLOSURE

The present disclosure relates to optical lens, in particular to a camera optical lens suitable for handheld devices such as smart phones and digital cameras and imaging devices.

DESCRIPTION OF RELATED ART

With the emergence of smart phones in recent years, the demand for miniature camera lens is increasing day by day, but the photosensitive devices of general camera lens are no other than Charge Coupled Device (CCD) or Complementary metal-Oxide Semiconductor Sensor (CMOS sensor), and as the progress of the semiconductor manufacturing technology makes the pixel size of the photosensitive devices shrink, coupled with the current development trend of electronic products being that their functions should be better and their shape should be thin and small, miniature camera lens with good imaging quality therefor has become a mainstream in the market. In order to obtain better imaging quality, the lens that is traditionally equipped in mobile phone cameras adopts a three-piece or four-piece lens structure. And, with the development of technology and the increase of the diverse demands of users, and under this circumstances that the pixel area of photosensitive devices is shrinking steadily and the requirement of the system for the imaging quality is improving constantly, the five-piece, six-piece and seven-piece lens structure gradually appear in lens design. There is an urgent need for ultra-thin wide-angle camera lenses which have good optical characteristics and the chromatic aberration of which is fully corrected.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
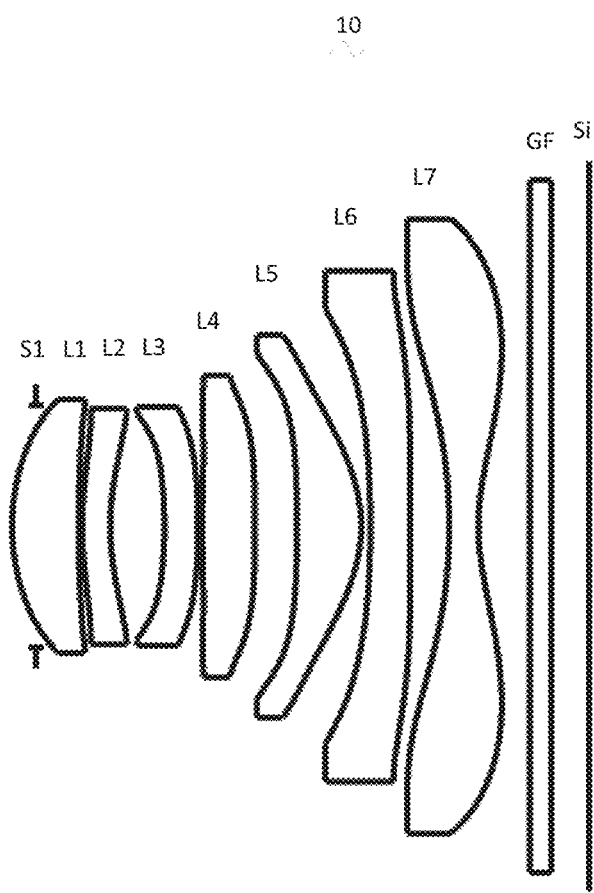
FIG. 1 is a schematic diagram of a camera optical lens in accordance with a first embodiment of the present invention.

As referring to FIG. 1, the present invention provides a camera optical lens 10. FIG. 1 shows the camera optical lens 10 of embodiment 1 of the present invention, the camera optical lens 10 comprises 7 lenses. Specifically, from the object side to the image side, the camera optical lens 10 comprises in sequence: an aperture S1, a first lens L1, a second lens L2, a third lens L3, a fourth lens L4, a fifth lens L5, a sixth lens L6 and a seventh lens L7. Optical element like optical filter GF can be arranged between the seventh lens L7 and the image surface Si. The first lens L1 is made of plastic material, the second lens L2 is made of plastic material, the third lens L3 is made of glass material, the fourth lens L4 is made of plastic material, the fifth lens L5 is made of plastic material, the sixth lens L6 is made of plastic material, the seventh lens L7 is made of plastic material;

Here, the focal length of the whole optical camera lens 10 is defined as f, the focal length of the first lens L1 is defined as f1, the focal length of the third lens L3 is defined as f3, the focal length of the fourth lens L4 is defined as f4, the refractive index of the third lens L3 is defined as n3, the thickness on-axis of the third lens L3 is defined as d3, the total optical length of the camera optical lens is defined as TTL, the curvature radius of object side surface of the seventh lens L7 is defined as R13, the curvature radius of image side surface of the seventh lens L7 is defined as R14. The f, f1, f3, f4, n4, d7, TTL, R13 and R14 meet the following conditions: $1.05 \leq f1/f \leq 1.5$; $1.7 \leq n3 \leq 2.2$; $-2 \leq f3/f4 \leq 2$; $-10 \leq (R13+R14)/(R13-R14) \leq 10$; $0.01 \leq d5/TTL \leq 0.1$.

Condition $1.05 \leq f1/f \leq 1.5$ fixes the positive refractive power of the first lens L1. If the lower limit of the set value is exceeded, although it benefits the ultra-thin development of lenses, but the positive refractive power of the first lens L1 will be too strong, problem like aberration is difficult to be corrected, and it is also unfavorable for wide-angle development of lens. On the contrary, if the higher limit of the set value is exceeded, the positive refractive power of the first lens L1 becomes too weak, it is then difficult to develop ultra-thin lenses. Preferably, the following condition shall be satisfied, $1.05 \leq f1/f \leq 1.2$.

Condition $1.7 \leq n3 \leq 2.2$ fixes the refractive index of the third lens L3, a refractive power within this range benefits the development of ultra-thin lenses, and it also benefits the correction of aberration. Preferably, the following condition shall be satisfied, $1.7 \leq n3 \leq 2.1$.

Condition $-2 \leq f3/f4 \leq 2$ fixes the ratio between the focal length f3 of the third lens L3 and the focal length f4 of the fourth lens L4, a ratio within this range can effectively reduce the sensitivity of lens group used in camera and further enhance the imaging quality. Preferably, the following condition shall be satisfied, $-0.5 \leq f3/f4 \leq 2$.

Condition $-10 \leq (R13+R14)/(R13-R14) \leq 10$ fixes the shape of the seventh lens L7, when the value is beyond this range, with the development into the direction of ultra-thin and wide-angle lenses, problem like aberration of the off-axis picture angle is difficult to be corrected. Preferably, the following condition shall be satisfied, $-1 \leq (R13+R14)/(R13-R14) \leq 1$.

Condition $0.01 \leq d5/TTL \leq 0.1$ fixes the ratio between the thickness on-axis of the third lens L3 and the total optical length TTL of the camera optical lens 10, a ratio within this range benefits the development of ultra-thin lenses. Preferably, the following condition shall be satisfied, $0.05 \leq d5/TTL \leq 0.075$.

When the focal length of the camera optical lens 10 of the present invention, the focal length of each lens, the refractive index of the related lens, and the total optical length, the thickness on-axis and the curvature radius of the camera optical lens meet the above conditions, the camera optical lens 10 has the advantage of high performance and meets the design requirement of low TTL.

In this embodiment, the object side surface of the first lens L1 is a convex surface relative to the proximal axis, its image side surface is a concave surface relative to the proximal axis, and it has positive refractive power; the focal length of the whole camera optical lens is f, the focal length of the first lens L1 is f1, the curvature radius of the object side surface of the first lens L1 is R1, the curvature radius of the image side surface of the first lens L1 is R2 and the thickness on-axis of the first lens L1 is d1, they meet the following condition: $-2.91 \leq (R1+R2)/(R1-R2) \leq -0.76$, this condition reasonably controls the shape of the first lens, then the first lens can effectively correct the spherical aberration of the system; if the condition $0.3 \leq d1 \leq 0.97$ is satisfied it is beneficial for the realization of ultra-thin lens. Preferably, the following conditions shall be satisfied, $-1.82 \leq (R1+R2)/(R1-R2) \leq -0.95$; $0.48 \leq d1 \leq 0.78$.

In this embodiment, the object side surface of the second lens L2 is a convex surface relative to the proximal axis, its image side surface is a concave surface relative to the proximal axis, the focal length of the whole camera optical lens 10 is f, the focal length of the second lens L2 is f2, the curvature radius of the object side surface of the second lens L2 is R3, the curvature radius of image side surface of the second lens L2 is R4 and the thickness on-axis of the second lens L2 is d3, they meet the following condition: when the condition $-6.26 \leq f2/f \leq -1.97$ is satisfied, the positive refractive power of the second lens L2 is controlled within reasonable scope, the spherical aberration caused by the first lens L1 which has positive refractive power and the field curvature of the system then can be reasonably and effectively balanced; the condition $2.63 \leq (R3+R4)/(R3-R4) \leq 8.78$ fixes the shape of the second lens L2, when value is beyond this range, with the development into the direction of ultra-thin and wide-angle lenses, problem like on-axis chromatic aberration is difficult to be corrected; if the condition $0.12 \leq d3 \leq 0.41$ is satisfied, it is beneficial for the realization of ultra-thin lenses. Preferably, the following conditions shall be satisfied, $-3.91 \leq f2/f \leq 1.58$; $4.21 \leq (R3+R4)/(R3-R4) \leq 7.03$; $0.19 \leq d3 \leq 0.33$.

In this embodiment, the object side surface of the third lens L3 is a concave surface relative to the proximal axis, its image side surface is a convex surface relative to the proximal axis, and it has negative refractive power; the focal length of the whole camera optical lens 10 is f, the focal length of the third lens L3 is f3, the curvature radius of the object side surface of the third lens L3 is R5, the curvature radius of the image side surface of the third lens L3 is R6 and the thickness on-axis of the third lens L3 is d5, they meet the condition: $-63.57 \leq f3/f \leq -1.09$, by meeting this condition, it is helpful for the system to obtain good ability in balancing the field curvature, so that the image quality can be effectively improved; by meeting the condition $-49.42 \leq (R5+R6)/(R5-R6) \leq -4.05$ the shape of the third lens L3 can be effectively controlled, it is beneficial for the shaping of the third lens L3 and bad shaping and stress generation due to extra large curvature of surface of the third lens 13 can be avoided; when the condition $0.11 \leq d5 \leq 0.51$ is satisfied, it is beneficial for the realization of ultra-thin lenses. Preferably, the following conditions shall be satisfied, $-39.73 \leq f3/f \leq -1.37$; $-30.89 \leq (R5+R6)/(R5-R6) \leq -5.07$; $0.18 \leq d5 \leq 0.41$.

In this embodiment, the object side surface of the fourth lens L4 is a convex surface relative to the proximal axis, the focal length of the whole camera optical lens 10 is f, the focal length of the fourth lens L4 is f4, the curvature radius of the object side surface of the fourth lens L4 is R7, the curvature radius of the image side surface of the fourth lens L4 is R8 and the thickness on-axis of the fourth lens L4 is d7, they meet the condition: $-33.45 \leq f4/f \leq 2057.31$, the appropriate distribution of refractive power makes it possible that the system has better imaging quality and lower sensitivity; the condition $-1.15 \leq (R7+R8)/(R7-R8) \leq 493.45$ fixes the shape of the fourth lens L4, when beyond this range, with the development into the direction of ultra-thin and wide-angle lens, the problem like chromatic aberration is difficult to be corrected; when the condition $0.25 \leq d7 \leq 0.91$ is satisfied, it is beneficial for realization of ultra-thin lenses. Preferably, the following conditions shall be satisfied, $-20.91 \leq f4/f \leq 1645.85$; $-0.72 \leq (R7+R8)/(R7-R8) \leq 394.76$; $0.41 \leq d7 \leq 0.73$.

In this embodiment, the image side surface of the fifth lens L5 is a convex surface relative to the proximal axis, the focal length of the whole camera optical lens 10 is f, the focal length of the fifth lens L5 is f5, the curvature radius of the object side surface of the fifth lens L5 is R9, the curvature radius of the image side surface of the fifth lens L5 is R10 and the thickness on-axis of the fifth lens L5 is d9, they meet the condition: $-19.07 \leq f5/f \leq 0.94$, the limitation on the fifth lens L5 can effectively make the light angle of the camera lens flat and the tolerance sensitivity reduces; the condition $0.43 \leq (R9+R10)/(R9-R10) \leq 1.71$ fixes the shape of the fifth lens L5, when beyond this range, with the development into the direction of ultra-thin and wide-angle lens, the problem like off-axis chromatic aberration is difficult to be corrected; when the condition $0.25 \leq d9 \leq 0.94$ is satisfied, it is beneficial for the realization of ultra-thin lens. Preferably, the following conditions shall be satisfied, $-11.92 \leq f5/f \leq 0.76$; $0.69 \leq (R9+R10)/(R9-R10) \leq 1.36$; $0.4 \leq d9 \leq 0.75$.

In this embodiment, the object side surface of the sixth lens L6 is a concave surface relative to the proximal axis, and it has negative refractive power; the focal length of the whole camera optical lens 10 is f, the focal length of the sixth lens L6 is f6, the curvature radius of the object side surface of the sixth lens L6 is R11, the curvature radius of the image side surface of the sixth lens L6 is R12 and the thickness on-axis of the sixth lens L6 is d11, they meet the condition: $-7.73 \leq f6/f \leq -1.2$, the appropriate distribution of refractive power makes it possible that the system has better imaging quality and lower sensitivity; the condition $-2.51 \leq (R11+R12)/(R11-R12) \leq -0.44$ fixes the shape of the sixth lens L6, when beyond this range, with the development into the direction of ultra-thin and wide-angle lenses, the problem like off-axis chromatic aberration is difficult to be corrected; when the condition $0.13 \leq d11 \leq 0.63$, is satisfied, it is beneficial for the realization of ultra-thin lens. Preferably, the following conditions shall be satisfied, $-4.83 \leq f6/f \leq -1.5$; $-1.57 \leq (R11+R12)/(R11-R12) \leq -0.55$; $0.2 \leq d11 \leq 0.5$.

In this embodiment, the object side surface of the seventh lens L7 is a concave surface relative to the proximal axis, its image side surface is a concave surface relative to the proximal axis, and it has negative refractive power; the focal length of the whole camera optical lens 10 is f, the focal length of the seventh lens L7 is f7 and the thickness on-axis of the seventh lens L7 is d13, they meet the conditions $-4.46 \leq f7/f \leq -0.47$, appropriate distribution of refractive power makes it possible that the system has better imaging quality and lower sensitivity; when the condition $0.14 \leq d13 \leq 0.64$ is satisfied, it is beneficial for the realization of ultra-thin lens. Preferably, the following conditions shall be satisfied, $-2.79 \leq f7/f \leq -0.58$; $0.22 \leq d13 \leq 0.51$.

In this embodiment, the total optical length TTL of the camera optical lens 10 is less than or equal to 6.15 mm, it is beneficial for the realization of ultra-thin lenses. Preferably, the total optical length TTL of the camera optical lens 10 is less than or equal to 5.87.

In this embodiment, the aperture F number of the camera optical lens 10 is less than or equal to 1.83. A large aperture has better imaging performance. Preferably, the aperture F number of the camera optical lens 10 is less than or equal to 1.80.

With such design, the total optical length TTL of the whole camera optical lens 10 can be made as short as possible, thus the miniaturization characteristics can be maintained.

In the following, an example will be used to describe the camera optical lens 10 of the present invention. The symbols recorded in each example are as follows. The unit of distance, radius and center thickness is mm.

TTL: Optical length (the distance on-axis from the object side surface to the image side surface of the first lens L1).

Preferably, inflexion points and/or arrest points can also be arranged on the object side surface and/or image side surface of the lens, so that the demand for high quality imaging can be satisfied, the description below can be referred for specific implementable scheme.

The design information of the camera optical lens 10 in the first embodiment of the present invention is shown in the following, the unit of the focal length, distance, radius and center thickness is mm.

The design information of the camera optical lens 10 in the first embodiment of the present invention is shown in the tables 1 and 2.

TABLE 1

| | R | d | | nd | vd |
|---|---|---|---|---|---|
| S1 | ∞ | d0 = | −0.232 | | |
| R1 | 2.114 | d1 = | 0.644 | nd1 1.5462 | v1 55.95 |
| R2 | 11.429 | d2 = | 0.036 | | |
| R3 | 3.594 | d3 = | 0.272 | nd2 1.6580 | v2 21.49 |

TABLE 1-continued

| | R | d | | nd | | vd | |
|---|---|---|---|---|---|---|---|
| R4 | 2.527 | d4 = | 0.524 | | | | |
| R5 | −4.942 | d5 = | 0.326 | nd3 | 1.7257 | v3 | 21.50 |
| R6 | −6.889 | d6 = | 0.042 | | | | |
| R7 | 12.170 | d7 = | 0.509 | nd4 | 1.5462 | v4 | 55.95 |
| R8 | −45.347 | d8 = | 0.407 | | | | |
| R9 | −21.651 | d9 = | 0.625 | nd5 | 1.5462 | v5 | 55.95 |
| R10 | −1.388 | d10 = | 0.087 | | | | |
| R11 | −10.306 | d11 = | 0.389 | nd6 | 1.6417 | v6 | 23.97 |
| R12 | −3103.794 | d12 = | 0.376 | | | | |
| R13 | −5.064 | d13 = | 0.281 | nd7 | 1.5462 | v7 | 55.95 |
| R14 | 2.067 | d14 = | 0.500 | | | | |
| R15 | ∞ | d15 = | 0.210 | ndg | 1.5187 | vg | 64.17 |
| R16 | ∞ | d16 = | 0.363 | | | | |

In which, the meaning of the various symbols is as follows.

S1: Aperture;

R: The curvature radius of the optical surface, the central curvature radius in case of lens;

R1: The curvature radius of the object side surface of the first lens L1;

R2: The curvature radius of the image side surface of the first lens L1;

R3: The curvature radius of the object side surface of the second lens L2;

R4: The curvature radius of the image side surface of the second lens L2;

R5: The curvature radius of the object side surface of the third lens L3;

R6: The curvature radius of the image side surface of the third lens L3;

R7: The curvature radius of the object side surface of the fourth lens L4;

R8: The curvature radius of the image side surface of the fourth lens L4;

R9: The curvature radius of the object side surface of the fifth lens L5;

R10: The curvature radius of the image side surface of the fifth lens L5;

R11: The curvature radius of the object side surface of the sixth lens L6;

R12: The curvature radius of the image side surface of the sixth lens L6;

R13: The curvature radius of the object side surface of the seventh lens L7;

R14: The curvature radius of the image side surface of the seventh lens L7;

R15: The curvature radius of the object side surface of the optical filter GF;

R16: The curvature radius of the image side surface of the optical filter GF;

d: The thickness on-axis of the lens and the distance on-axis between the lens;

d0: The distance on-axis from aperture S1 to the object side surface of the first lens L1;

d1: The thickness on-axis of the first lens L1;

d2: The distance on-axis from the image side surface of the first lens L1 to the object side surface of the second lens L2;

d3: The thickness on-axis of the second lens L2;

d4: The distance on-axis from the image side surface of the second lens L2 to the object side surface of the third lens L3;

d5: The thickness on-axis of the third lens L3;

d6: The distance on-axis from the image side surface of the third lens L3 to the object side surface of the fourth lens L4;
d7: The thickness on-axis of the fourth lens L4;
d8: The distance on-axis from the image side surface of the fourth lens L4 to the object side surface of the fifth lens L5;
d9: The thickness on-axis of the fifth lens L5;
d10: The distance on-axis from the image side surface of the fifth lens L5 to the object side surface of the sixth lens L6;
d11: The thickness on-axis of the sixth lens L6;
d12: The distance on-axis from the image side surface of the sixth lens L6 to the object side surface of the seventh lens L7;
d13: The thickness on-axis of the seventh lens L7;
d14: The distance on-axis from the image side surface of the seventh lens L7 to the object side surface of the optical filter GF;
d15: The thickness on-axis of the optical filter GF;
d16: The distance on-axis from the image side surface to the image surface of the optical filter GF;
nd: The refractive index of the d line;
nd1: The refractive index of the d line of the first lens L1;
nd2: The refractive index of the d line of the second lens L2;
nd3: The refractive index of the d line of the third lens L3;
nd4: The refractive index of the d line of the fourth lens L4;
nd5: The refractive index of the d line of the fifth lens L5;
nd6: The refractive index of the d line of the sixth lens L6;
nd7: The refractive index of the d line of the seventh lens L7;
ndg: The refractive index of the d line of the optical filter GF;
vd: The abbe number;
v1: The abbe number of the first lens L1;
v2: The abbe number of the second lens L2;
v3: The abbe number of the third lens L3;
v4: The abbe number of the fourth lens L4;
v5: The abbe number of the fifth lens L5;
v6: The abbe number of the sixth lens L6;
v7: The abbe number of the seventh lens L7;
vg: The abbe number of the optical filter GF;
Table 2 shows the aspherical surface data of the camera optical lens 10 in the embodiment 1 of the present invention.

Where, K is a conic index, A4, A6, A8, A10, A12, A14, a16 are aspheric surface indexes.
IH: Image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (1)$$

For convenience, the aspheric surface of each lens surface uses the aspheric surfaces shown in the above condition (1). However, the present invention is not limited to the aspherical polynomials form shown in the condition (1).

Table 3 and table 4 show the inflexion points and the arrest point design data of the camera optical lens 10 lens in embodiment 1 of the present invention. In which, R1 and R2 represent respectively the object side surface and image side surface of the first lens L1, R3 and R4 represent respectively the object side surface and image side surface of the second lens L2, R5 and R6 represent respectively the object side surface and image side surface of the third lens L3, R7 and R8 represent respectively the object side surface and image side surface of the fourth lens L4, R9 and R10 represent respectively the object side surface and image side surface of the fifth lens L5, R11 and R12 represent respectively the object side surface and image side surface of the sixth lens L6, R13 and R14 represent respectively the object side surface and image side surface of the seventh lens L7. The data in the column named "inflexion point position" are the vertical distances from the inflexion points arranged on each lens surface to the optic axis of the camera optical lens 10. The data in the column named "arrest point position" are the vertical distances from the arrest points arranged on each lens surface to the optic axis of the camera optical lens 10.

TABLE 3

| | Inflexion point number | Inflexion point position 1 | Inflexion point position 2 |
|---|---|---|---|
| R1 | | | |
| R2 | 1 | 1.145 | |
| R3 | 1 | 0.645 | |
| R4 | 1 | 0.755 | |
| R5 | 1 | 1.055 | |
| R6 | 1 | 1.125 | |
| R7 | 2 | 0.395 | 0.735 |
| R8 | 1 | 1.295 | |
| R9 | 1 | 1.555 | |
| R10 | 2 | 1.185 | 1.525 |
| R11 | 1 | 1.995 | |

TABLE 2

| | Conic Index | Aspheric Surface Indexes | | | | | | |
|---|---|---|---|---|---|---|---|---|
| | k | A4 | A6 | A8 | A10 | A12 | A14 | A16 |
| R1 | −6.58E−02 | 1.16E−02 | 2.07E−03 | 9.03E−04 | 1.81E−03 | 2.23E−04 | −7.45E−04 | 7.76E−04 |
| R2 | −9.90E+01 | −3.37E−03 | 1.52E−03 | 3.89E−03 | 1.75E−03 | −5.58E−04 | −1.88E−04 | −3.49E−04 |
| R3 | −1.27E+01 | −2.69E−02 | −1.09E−02 | 2.16E−03 | −1.09E−03 | 4.99E−03 | 1.81E−03 | −4.25E−03 |
| R4 | −5.64E+00 | −6.51E−03 | −1.79E−02 | −5.06E−03 | −2.92E−03 | 4.94E−03 | 4.65E−03 | −3.35E−03 |
| R5 | 1.39E+01 | −3.05E−02 | −4.04E−02 | −2.53E−02 | 9.50E−03 | 9.91E−03 | −6.18E−03 | 7.01E−03 |
| R6 | 2.42E+01 | −1.92E−02 | −3.83E−02 | 6.60E−03 | 8.35E−03 | 3.89E−04 | −1.54E−03 | 9.92E−04 |
| R7 | 2.91E+01 | −5.17E−02 | 1.26E−02 | 1.49E−03 | 6.35E−05 | 6.35E−05 | −2.83E−05 | 1.83E−05 |
| R8 | −9.90E+01 | −6.99E−02 | 3.19E−03 | 2.14E−03 | −4.63E−04 | −3.19E−04 | 5.67E−05 | 1.51E−04 |
| R9 | −3.81E+01 | −3.87E−02 | −1.27E−04 | −1.62E−04 | −1.15E−03 | 1.43E−04 | 9.40E−05 | −8.27E−07 |
| R10 | −3.62E+00 | −3.42E−02 | 1.77E−02 | −1.07E−03 | −4.29E−04 | −2.34E−05 | 1.19E−05 | −9.59E−07 |
| R11 | −6.39E+00 | −1.37E−02 | 9.40E−06 | 3.65E−04 | 2.88E−06 | −3.40E−05 | 1.20E−07 | 9.99E−07 |
| R12 | 9.74E+01 | −9.00E−03 | 1.17E−04 | 7.44E−05 | 7.89E−06 | −7.06E−07 | −1.03E−07 | 2.44E−08 |
| R13 | 1.14E+00 | −3.51E−03 | 2.33E−03 | 4.15E−05 | −1.38E−05 | −1.09E−06 | −9.69E−09 | 1.32E−08 |
| R14 | −1.06E+01 | −2.59E−02 | 4.20E−03 | −5.18E−04 | 2.00E−05 | 1.12E−06 | 1.63E−08 | −1.14E−08 |

TABLE 3-continued

| Inflexion point number | Inflexion point position 1 | Inflexion point position 2 |
|---|---|---|
| R12 | 1 | 2.005 |
| R13 | 1 | 1.545 |
| R14 | 1 | 0.755 |

TABLE 4

| | Arrest point number | Arrest point position 1 | Arrest point position 2 |
|---|---|---|---|
| R1 | | | |
| R2 | | | |
| R3 | 1 | 1.065 | |
| R4 | | | |
| R5 | | | |
| R6 | | | |
| R7 | 2 | 1.035 | 1.205 |
| R8 | | | |
| R9 | | | |
| R10 | | | |
| R11 | | | |
| R12 | 1 | 2.415 | |
| R13 | 1 | 2.665 | |
| R14 | 1 | 1.715 | |

Figure 2:
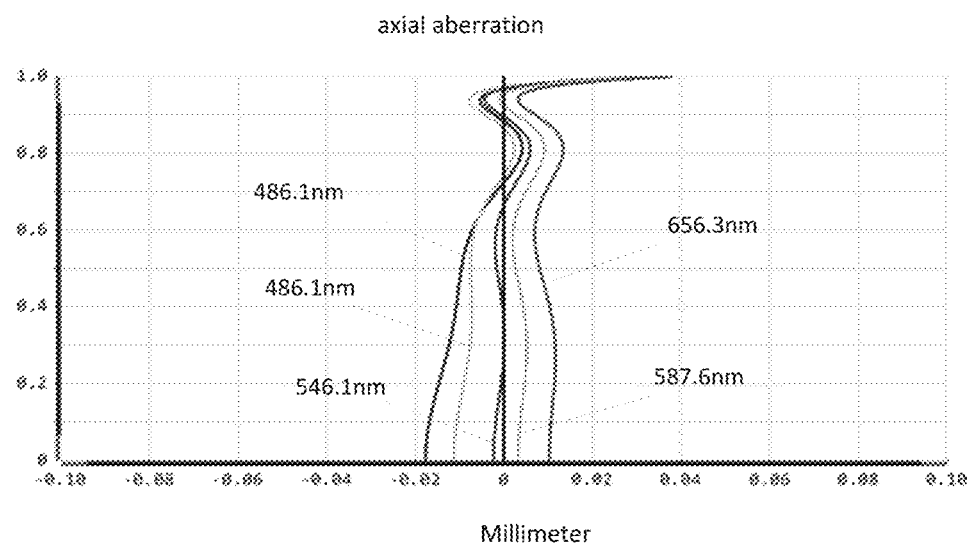
FIG. 2 shows the axial aberration of the camera optical lens shown in FIG. 1.
Figure 3:
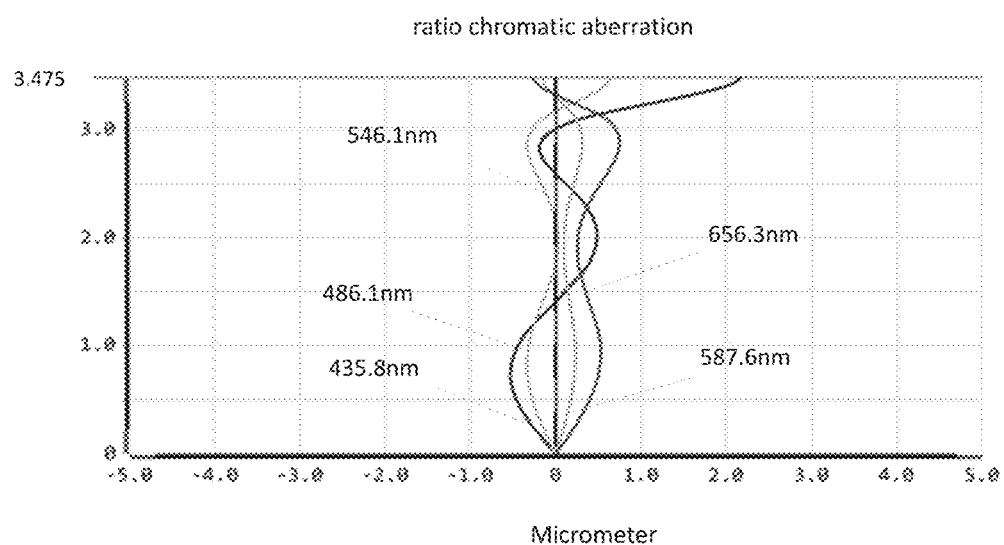
FIG. 3 shows the ratio chromatic aberration of the camera optical lens shown in FIG. 1.
Figure 4:
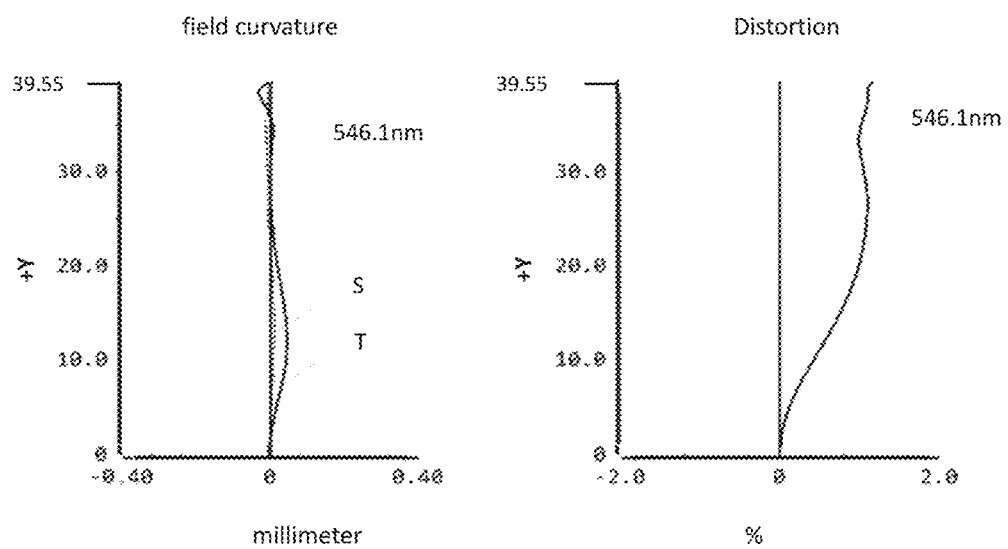
FIG. 4 presents a schematic diagram of the field curvature and distortion of the camera optical lens shown in FIG. 1.
Figure 5:
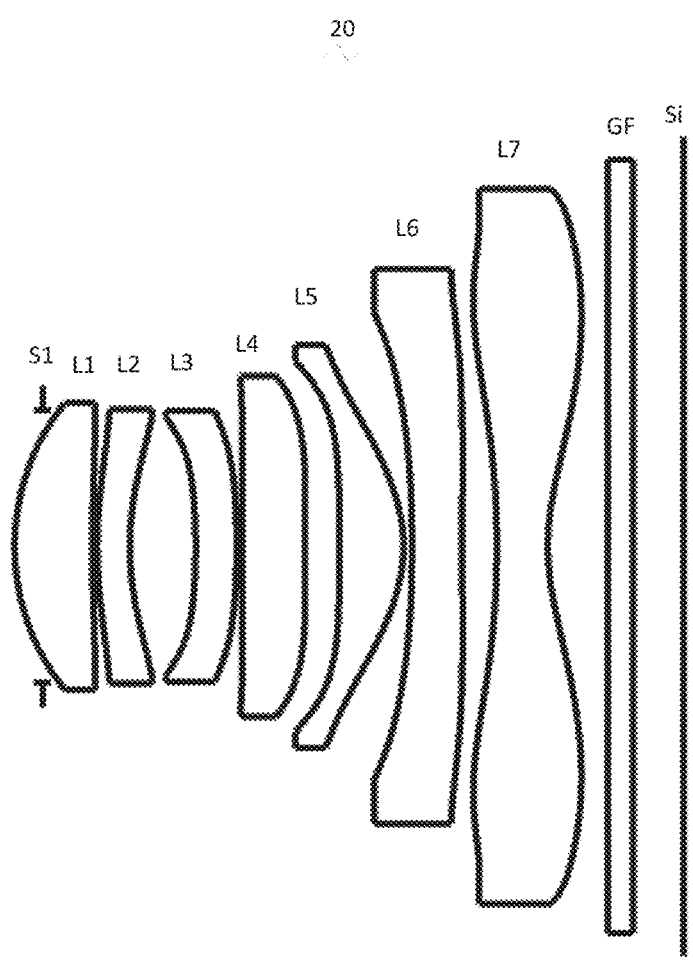
FIG. 5 is a schematic diagram of a camera optical lens in accordance with a second embodiment of the present invention.

FIG. 2 and FIG. 3 show the axial aberration and ratio chromatic aberration schematic diagrams after light with a wavelength of 435.8 nm, 486.1 nm, 546.1 nm, 587.6 nm and 656.3 nm passes the camera optical lens 10 in the first embodiment. FIG. 4 shows the field curvature and distortion schematic diagrams after light with a wavelength of 546.1 nm passes the camera optical lens 10 in the first embodiment, the field curvature S in FIG. 4 is a field curvature in the sagittal direction, T is a field curvature in the meridian direction.

Table 13 shows the various values of the embodiments 1, 2, 3 and the values corresponding with the parameters which are already specified in the condition expressions.

As shown in Table 13, the first embodiment meets the various condition expressions.

In this embodiment, the pupil entering diameter of the camera optical lens is 2.335 mm, the full vision field image height is 3.475 mm, the vision field angle in the diagonal direction is 79.09°, it has wide-angle and is ultra-thin, its on-axis and off-axis chromatic aberrations are fully corrected, and it has excellent optical characteristics.

Embodiment 2

Embodiment 2 is basically the same as embodiment 1, the meaning of its symbols is the same as that of embodiment 1, in the following, only the differences are listed.

Table 5 and table 6 show the design data of the camera optical lens 20 in embodiment 2 of the present invention.

TABLE 5

| | R | d | nd | | vd | |
|---|---|---|---|---|---|---|
| S1 | ∞ | d0 = −0.232 | | | | |
| R1 | 2.051 | d1 = 0.648 | nd1 | 1.5462 | v1 | 55.95 |
| R2 | 12.467 | d2 = 0.039 | | | | |
| R3 | 3.646 | d3 = 0.273 | nd2 | 1.6580 | v2 | 21.49 |
| R4 | 2.481 | d4 = 0.550 | | | | |
| R5 | −5.954 | d5 = 0.341 | nd3 | 1.7270 | v3 | 21.50 |
| R6 | −7.600 | d6 = 0.046 | | | | |
| R7 | 16.399 | d7 = 0.524 | nd4 | 1.5462 | v4 | 55.95 |
| R8 | 16.300 | d8 = 0.288 | | | | |
| R9 | −67.973 | d9 = 0.535 | nd5 | 1.5462 | v5 | 55.95 |
| R10 | −1.331 | d10 = 0.072 | | | | |
| R11 | −10.210 | d11 = 0.418 | nd6 | 1.6417 | v6 | 23.97 |
| R12 | 49.431 | d12 = 0.288 | | | | |
| R13 | −8.01382268 | d13 = 0.425 | nd7 | 1.5462 | v7 | 55.95 |
| R14 | 2.013930329 | d14 = 0.500 | | | | |
| R15 | ∞ | d15 = 0.210 | ndg | 1.5187 | vg | 64.17 |
| R16 | ∞ | d16 = 0.419 | | | | |

Table 6 shows the aspherical surface data of each lens of the camera optical lens 20 in embodiment 2 of the present invention.

TABLE 6

| | Conic Index | Aspherical Surface Index | | | | | | |
|---|---|---|---|---|---|---|---|---|
| | k | A4 | A6 | A8 | A10 | A12 | A14 | A16 |
| R1 | −2.4616E−01 | 8.7134E−03 | −3.4228E−04 | 4.0745E−04 | 1.0503E−03 | 4.4668E−05 | −6.7134E−04 | 1.2377E−04 |
| R2 | −9.9009E+01 | −2.1242E−02 | 7.6518E−03 | 3.5581E−03 | −7.7349E−04 | −2.4153E−03 | −7.5647E−04 | 7.5340E−04 |
| R3 | −1.3799E+01 | −2.6252E−02 | −4.7358E−03 | 8.9054E−03 | −1.9476E−03 | 1.5600E−04 | −2.4088E−04 | −3.3015E−04 |
| R4 | −4.3775E+00 | −3.1328E−03 | −1.5017E−02 | 1.6588E−03 | −4.1349E−04 | −1.1769E−03 | −2.3299E−03 | 2.5364E−03 |
| R5 | 1.4506E+01 | −3.7436E−02 | −3.7589E−02 | −3.1936E−02 | 7.8982E−03 | 1.1386E−02 | −5.2191E−03 | 7.1518E−03 |
| R6 | 2.4457E+01 | −1.8072E−02 | −3.9807E−02 | 5.5249E−03 | 7.2072E−03 | 1.1717E−04 | −1.2119E−03 | 1.5339E−03 |
| R7 | 9.1144E+01 | −4.7604E−02 | 1.6164E−02 | 2.2585E−03 | −6.6153E−04 | −5.2126E−04 | −1.8412E−04 | 2.6209E−05 |
| R8 | −1.8622E+01 | −7.3328E−02 | 3.1761E−03 | 2.1309E−03 | −4.1243E−04 | −2.3675E−04 | 7.3486E−06 | −2.7317E−05 |
| R9 | 9.9002E+01 | −4.3440E−02 | −1.9856E−03 | −5.5801E−04 | −1.1700E−03 | 1.4901E−04 | 9.2817E−05 | 1.3514E−06 |
| R10 | −3.3657E+00 | −3.2812E−02 | 1.8657E−02 | −7.8995E−04 | −3.8682E−04 | −2.1754E−05 | 9.2905E−06 | −2.2958E−06 |
| R11 | −4.4274E+01 | −1.2014E−02 | 1.3965E−04 | 3.5312E−04 | −3.0603E−06 | −3.5309E−05 | 3.3870E−08 | 1.0788E−06 |
| R12 | 7.4279E+01 | −8.8375E−03 | 1.4984E−04 | 7.9187E−05 | 8.3979E−06 | −6.7669E−07 | −1.1314E−07 | 1.8657E−08 |
| R13 | 2.0426E+00 | −4.2208E−03 | 2.2636E−03 | 3.5179E−05 | −1.4531E−05 | −1.1847E−06 | −1.6576E−08 | 1.2327E−08 |
| R14 | −8.9700E+00 | −2.4422E−02 | 4.3317E−03 | −5.1049E−04 | 2.0447E−05 | 1.1349E−06 | 1.7312E−08 | −1.1326E−08 |

Table 7 and table 8 show the inflexion points and the arrest point design data of the camera optical lens 20 lens in embodiment 2 of the present invention.

TABLE 7

| | Inflexion point number | Inflexion point position 1 | Inflexion point position 2 | Inflexion point position 3 |
|---|---|---|---|---|
| R1 | | | | |
| R2 | 1 | 0.635 | | |
| R3 | 1 | 0.735 | | |
| R4 | 2 | 1.085 | | |
| R5 | 1 | 1.045 | | |

TABLE 7-continued

| Inflexion point number | Inflexion point position 1 | Inflexion point position 2 | Inflexion point position 3 |
|---|---|---|---|
| R6 | 1 | 1.085 | |
| R7 | 3 | 0.365 | 1.005 | 1.085 |
| R8 | 1 | 0.065 | |
| R9 | | | |
| R10 | 2 | 1.095 | 1.625 |
| R11 | 1 | 1.985 | |
| R12 | 2 | 0.455 | 1.945 |
| R13 | 2 | 1.385 | 2.525 |
| R14 | 1 | 0.815 | |

TABLE 8

| | Arrest point number | Arrest point position 1 | Arrest point position 2 |
|---|---|---|---|
| R1 | | | |
| R2 | 1 | 1.085 | |
| R3 | | | |
| R4 | | | |
| R5 | | | |
| R6 | | | |
| R7 | 3 | 0.685 | |
| R8 | 1 | 0.455 | |
| R9 | | | |
| R10 | | | |
| R11 | | | |
| R12 | 2 | 1.945 | 2.355 |
| R13 | 1 | 2.105 | |
| R14 | 1 | 1.965 | |

Figure 6:
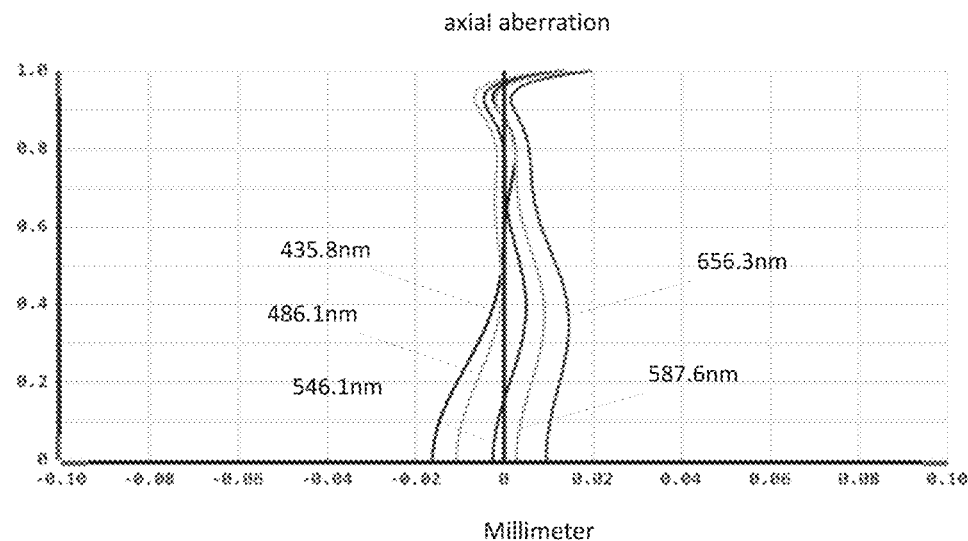
FIG. 6 presents the axial aberration of the camera optical lens shown in FIG. 5.
Figure 7:
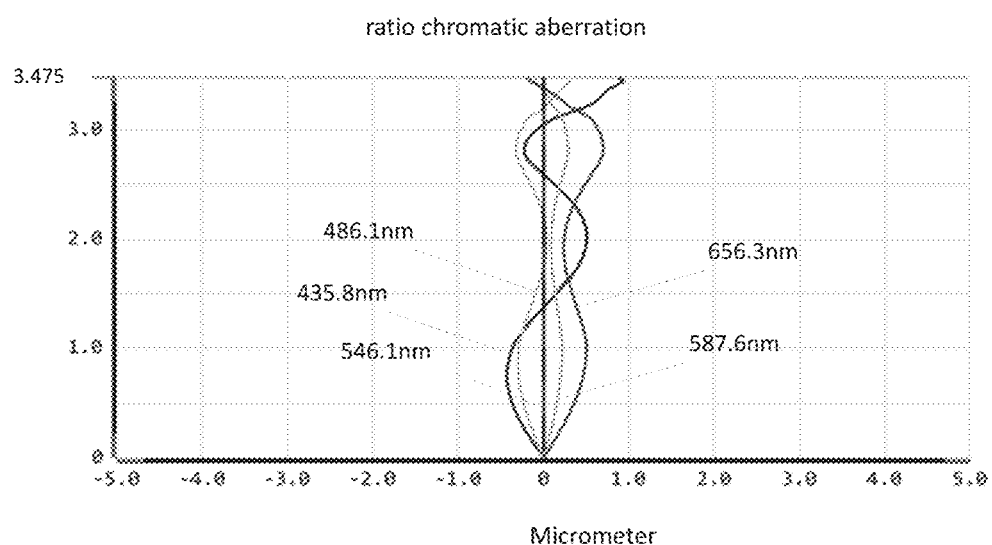
FIG. 7 presents the ratio chromatic aberration of the camera optical lens shown in FIG. 5.
Figure 8:
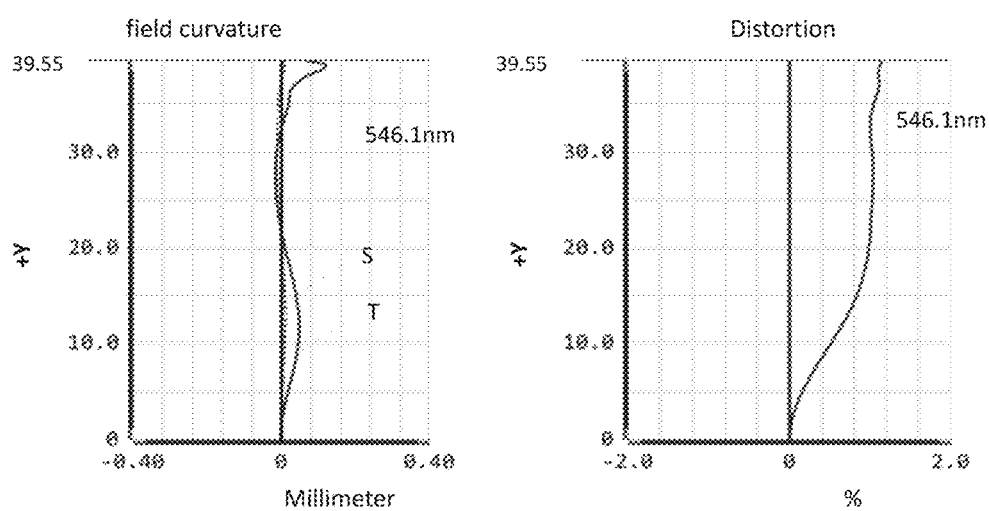
FIG. 8 presents the field curvature and distortion of the camera optical lens shown in FIG. 5
Figure 9:
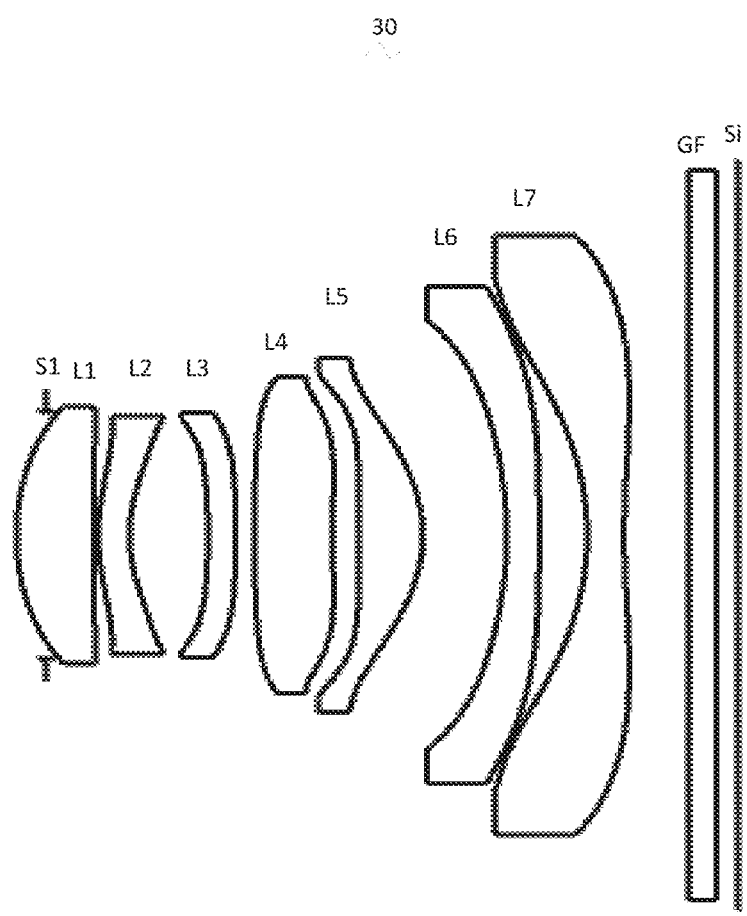
FIG. 9 is a schematic diagram of a camera optical lens in accordance with a third embodiment of the present invention.

FIG. 6 and FIG. 7 show the axial aberration and ratio chromatic aberration schematic diagrams after light with a wavelength of 435.8 nm, 486.1 nm, 546.1 nm, 587.6 nm, 656.3 nm passes the camera optical lens 20 in the second embodiment. FIG. 8 shows the field curvature and distortion schematic diagrams after light with a wavelength of 546.1 nm passes the camera optical lens 20 in the second embodiment.

As shown in Table 13, the second embodiment meets the various conditions.

In this embodiment, the pupil entering diameter of the camera optical lens is 2.336 mm, the full vision field image height is 3.475 mm, the vision field angle in the diagonal direction is 79.09°, it has wide-angle and is ultra-thin, its on-axis and off-axis chromatic aberrations are fully corrected, and it has excellent optical characteristics.

Embodiment 3

Embodiment 3 is basically the same as embodiment 1, the meaning of its symbols is the same as that of embodiment 1, in the following, only the differences are listed.

The design information of the camera optical lens 30 in the third first embodiment of the present invention is shown in the tables 9 and 10.

TABLE 9

| | R | d | | nd | | vd |
|---|---|---|---|---|---|---|
| S1 | ∞ | d0 = | −0.232 | | | |
| R1 | 2.528 | d1 = | 0.595 | nd1 | 1.5462 | v1 | 55.95 |
| R2 | 39.804 | d2 = | 0.039 | | | |
| R3 | 2.277 | d3 = | 0.243 | nd2 | 1.6580 | v2 | 21.49 |
| R4 | 1.612 | d4 = | 0.606 | | | |
| R5 | −8.740 | d5 = | 0.221 | nd3 | 2.0000 | v3 | 21.50 |
| R6 | −9.477 | d6 = | 0.138 | | | |
| R7 | 12.112 | d7 = | 0.610 | nd4 | 1.5462 | v4 | 55.95 |
| R8 | 9.020 | d8 = | 0.198 | | | |
| R9 | 20.412 | d9 = | 0.502 | nd5 | 1.5462 | v5 | 55.95 |
| R10 | −1.523 | d10 = | 0.649 | | | |
| R11 | −4.238 | d11 = | 0.252 | nd6 | 1.6417 | v6 | 23.97 |
| R12 | −37.483 | d12 = | 0.373 | | | |
| R13 | −3.064 | d13 = | 0.286 | nd7 | 1.5462 | v7 | 55.95 |
| R14 | 9.061 | d14 = | 0.500 | | | |
| R15 | ∞ | d15 = | 0.210 | ndg | 1.5187 | vg | 64.17 |
| R16 | ∞ | d16 = | 0.178 | | | |

Table 10 shows the aspherical surface data of each lens of the camera optical lens 30 in embodiment 3 of the present invention.

TABLE 10

| | Conic Index | Aspherical Surface Index | | | | | | |
|---|---|---|---|---|---|---|---|---|
| | k | A4 | A6 | A8 | A10 | A12 | A14 | A16 |
| R1 | 3.8514E−01 | 1.6752E−02 | −1.3794E−02 | 3.8728E−02 | −4.2829E−02 | 2.2903E−02 | −2.4770E−03 | −1.0936E−03 |
| R2 | 9.9006E+01 | −1.3158E−02 | 4.4524E−02 | −3.2026E−02 | −4.8542E−03 | 7.8022E−03 | 1.0275E−02 | −7.9867E−03 |
| R3 | −6.6276E+00 | −7.4407E−02 | −5.0585E−03 | 5.3682E−02 | −7.3883E−02 | 2.0058E−03 | 5.8889E−02 | −3.0282E−02 |
| R4 | −4.6881E+00 | −1.4354E−02 | −5.7898E−02 | 7.9738E−02 | −5.7887E−02 | 4.1464E−03 | 2.3510E−02 | −3.6852E−03 |
| R5 | −1.7329E+01 | −3.4337E−02 | −3.6924E−02 | −4.1227E−02 | 9.9216E−03 | 1.4438E−02 | −5.7469E−03 | 2.6960E−03 |
| R6 | 1.0158E+01 | −8.4726E−03 | −4.5837E−02 | −3.4739E−03 | 4.5538E−03 | 2.3901E−03 | 1.5152E−03 | −1.8285E−03 |
| R7 | 5.7773E+01 | −3.3619E−02 | 2.3249E−02 | 2.2730E−03 | −3.4739E−03 | −2.8820E−04 | 9.3361E−04 | −2.2105E−04 |
| R8 | −4.2617E+01 | −8.3554E−02 | −2.2152E−03 | 5.3402E−05 | −4.5348E−04 | 3.0375E−04 | 4.6695E−04 | −5.6533E−06 |
| R9 | −9.9001E+01 | −5.0227E−02 | −8.9263E−03 | −1.7376E−03 | −1.3588E−03 | 3.1612E−04 | 1.6503E−04 | 7.0158E−05 |
| R10 | −3.4682E+00 | −4.3778E−02 | 1.8485E−02 | −1.9649E−04 | −3.4735E−06 | 7.2696E−05 | 2.1754E−05 | −1.8098E−05 |
| R11 | −1.7430E+01 | −1.1851E−02 | −1.6618E−03 | 2.3643E−04 | 2.0728E−05 | −2.2386E−05 | 5.1462E−07 | 7.4375E−08 |
| R12 | 9.9003E+01 | −1.4655E−02 | 9.0132E−05 | 7.9070E−05 | 9.6680E−06 | −3.5653E−07 | −6.5423E−08 | 2.2150E−09 |
| R13 | 4.2240E−01 | −6.3440E−04 | 3.0720E−03 | 1.2326E−04 | −5.9641E−06 | −6.7124E−07 | −1.9676E−09 | 2.5400E−08 |
| R14 | 1.4836E+00 | −2.4815E−02 | 3.9627E−03 | −5.1046E−04 | 2.1289E−05 | 1.1792E−06 | 2.4512E−08 | −1.5888E−08 |

Table 11 and table 12 show the inflexion points and the arrest point design data of the camera optical lens 30 lens in embodiment 3 of the present invention.

TABLE 11

| | Inflexion point number | Inflexion point position 1 | Inflexion point position 2 |
|---|---|---|---|
| R1 | | | |
| R2 | 1 | 0.995 | |
| R3 | 1 | 0.585 | |
| R4 | 0 | | |

TABLE 11-continued

| | Inflexion point number | Inflexion point position 1 | Inflexion point position 2 |
|---|---|---|---|
| R5 | | | |
| R6 | | | |
| R7 | | | |
| R8 | 2 | 0.325 | 1.285 |
| R9 | 2 | 0.285 | 1.405 |
| R10 | 1 | 1.115 | |
| R11 | | | |
| R12 | 1 | 2.285 | |
| R13 | 2 | 1.615 | 2.285 |
| R14 | | | |

TABLE 12

| | Arrest point number | Arrest point position 1 |
|---|---|---|
| R1 | | |
| R2 | 1 | 1.105 |
| R3 | 1 | 1.035 |
| R4 | | |
| R5 | | |
| R6 | | |
| R7 | | |
| R8 | 1 | 0.555 |
| R9 | 1 | 0.475 |
| R10 | | |
| R11 | | |
| R12 | | |
| R13 | | |
| R14 | | |

Figure 10:
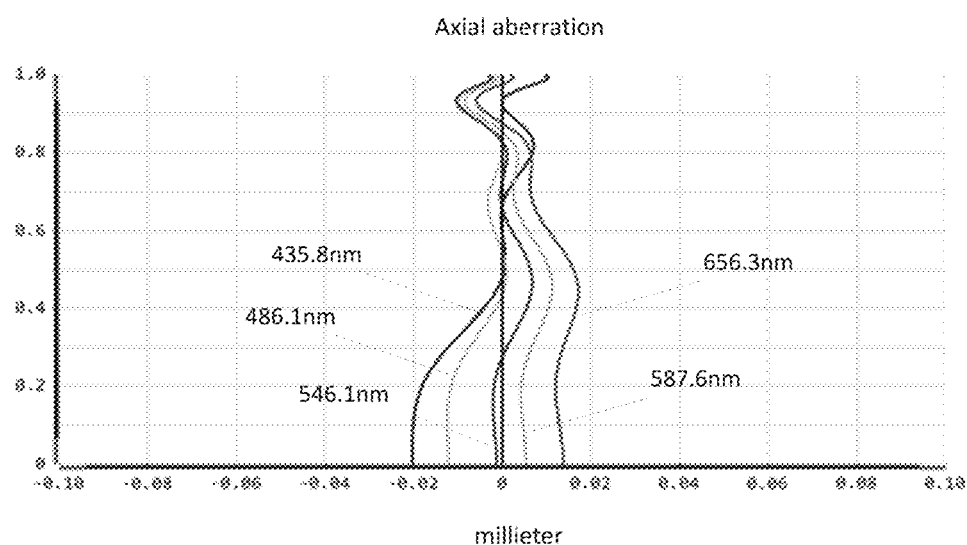
FIG. 10 presents the axial aberration of the camera optical lens shown in FIG. 9.
Figure 11:
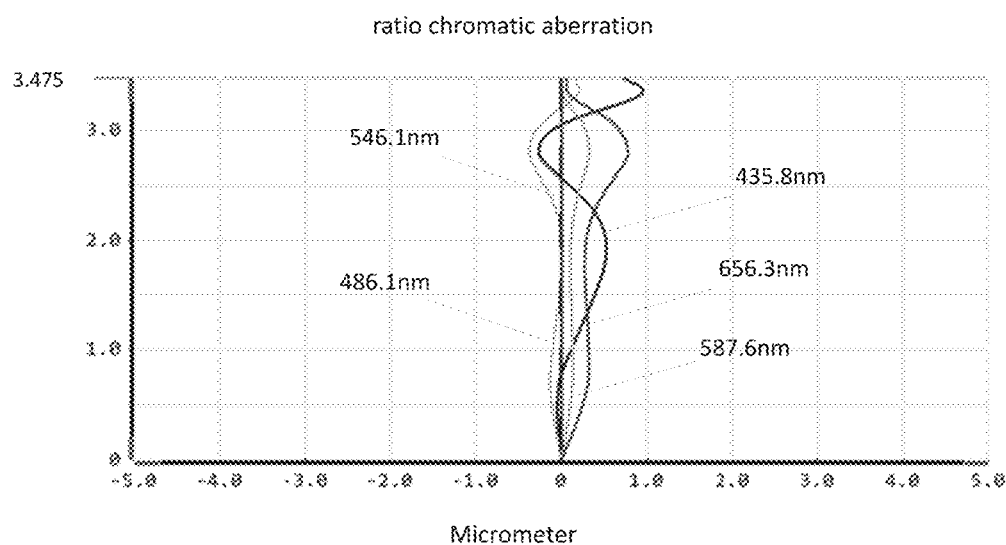
FIG. 11 presents the ratio chromatic aberration of the camera optical lens shown in FIG. 9.
Figure 12:
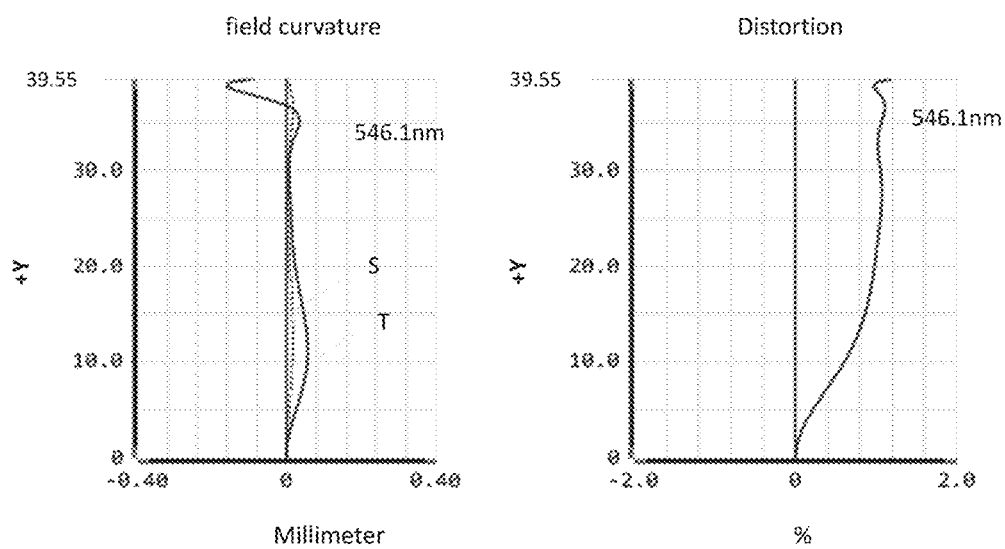
FIG. 12 presents the field curvature and distortion of the camera optical lens shown in FIG. 9.

FIG. 10 and FIG. 11 show the axial aberration and ratio chromatic aberration schematic diagrams after light with a wavelength of 435.8 nm, 486.1 nm, 546.1 nm, 587.6 nm and 656.3 passes the camera optical lens 30 in the first embodiment. FIG. 12 shows the field curvature and distortion schematic diagrams after light with a wavelength of 546.1 nm passes the camera optical lens 30 in the third embodiment.

The following table 13, in accordance with the above condition expressions, lists the values in this embodiment corresponding with each condition expression. Apparently, the camera optical system of this embodiment meets the above condition expressions.

In this embodiment, the pupil entering diameter of the camera optical lens is 2.335 mm, the full vision field image height is 3.475 mm, the vision field angle in the diagonal direction is 79.10°, it has wide-angle and is ultra-thin, its on-axis and off-axis chromatic aberrations are fully corrected, and it has excellent optical characteristics.

TABLE 13

| | Embodiment 1 | Embodiment 2 | Embodiment 3 |
|---|---|---|---|
| f | 4.157 | 4.159 | 4.157 |
| f1 | 4.635 | 4.397 | 4.914 |
| f2 | 5.462 | −13.017 | −9.828 |
| f3 | −6.810 | −41.414 | −132.119 |
| f4 | 22.281 | 5703.607 | −69.526 |
| f5 | −39.636 | 2.478 | 2.616 |
| f6 | −16.060 | −13.151 | −7.468 |
| f7 | −9.270 | −2.903 | −4.157 |
| f3/f4 | −0.306 | −0.007 | 1.900 |
| (R1 + R2)/(R1 − R2) | −1.454 | −1.394 | −1.136 |
| (R3 + R4)/(R3 − R4) | 5.739 | 5.262 | 5.854 |
| (R5 + R6)/(R5 − R6) | −6.079 | −8.232 | −24.710 |
| (R7 + R8)/(R7 − R8) | −0.577 | 328.966 | 6.834 |
| (R9 + R10)/(R9 − R10) | 1.137 | 1.040 | 0.861 |
| (R11 + R12)/(R11 − R12) | −1.007 | −0.658 | −1.255 |
| (R13 + R14)/(R13 − R14) | 0.420 | 0.598 | −0.495 |
| f1/f | 1.115 | 1.057 | 1.182 |
| f2/f | 1.314 | −3.130 | −2.364 |
| f3/f | −1.638 | −9.959 | −31.785 |
| f4/f | 5.360 | 1371.538 | −16.726 |
| f5/f | −9.536 | 0.596 | 0.629 |
| f6/f | −3.864 | −3.162 | −1.797 |
| f7/f | −2.230 | −0.698 | −1.000 |
| d1 | 0.644 | 0.648 | 0.595 |
| d3 | 0.272 | 0.273 | 0.243 |
| d5 | 0.326 | 0.341 | 0.221 |
| d7 | 0.509 | 0.524 | 0.610 |
| d9 | 0.625 | 0.535 | 0.502 |
| d11 | 0.389 | 0.418 | 0.252 |
| d13 | 0.281 | 0.425 | 0.286 |
| Fno | 1.780 | 1.780 | 1.780 |
| TTL | 5.590 | 4.947 | 5.212 |
| d5/TTL | 0.058 | 0.069 | 0.042 |
| n1 | 1.5462 | 1.5462 | 1.5462 |
| n2 | 1.6580 | 1.6580 | 1.6580 |
| n3 | 1.7257 | 1.7270 | 2.0000 |
| n4 | 1.5462 | 1.5462 | 1.5462 |
| n5 | 1.5462 | 1.5462 | 1.5462 |
| n6 | 1.6417 | 1.6417 | 1.6417 |
| n7 | 1.5462 | 1.5462 | 1.5462 |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera optical lens comprising, from an object side to an image side in sequence: a first lens, a second lens, a third lens, a fourth lens, a fifth lens, a sixth lens and a seventh lens; the first lens having a positive refractive power, the third lens having a negative refractive power, the sixth lens having a negative refractive power, and the seventh lens having a negative refractive power, wherein, the second lens includes a convex object side surface and a concave image side surface and the camera optical lens satisfies the following conditions:

$1.05 \leq f1/f \leq 1.5;$ $1.7 \leq n3 \leq 2.2;$ $-2 \leq f3/f4 \leq 2$ $-10 \leq (R13+R14)/(R13-R14) \leq 10;$ $0.01 \leq d5/TTL \leq 0.1;$ $2.63 \leq (R3+R4)/(R3-R4) \leq 8.78;$ where
f: a focal length of the optical camera lens;
f1: a focal length of the first lens;
f3: a focal length of the third lens;
f4: a focal length of the fourth lens;
n3: a refractive index of the third lens;
d5: a thickness on-axis of the third lens;

TTL: a total distance from an object side surface of the first lens to an image surface along an optic axis;
R13: a curvature radius of an object side surface of the seventh lens;
R14: a curvature radius of an image side surface of the seventh lens;
R3: a curvature radius of the object side surface of the second lens;
R4: a curvature radius of the image side surface of the second lens.

2. The camera optical lens as described in claim 1, wherein the first lens is made of plastic material, the second lens is made of plastic material, the third lens is made of glass material, the fourth lens is made of plastic material, the fifth lens is made of plastic material, the sixth lens is made of plastic material, the seventh lens is made of plastic material.

3. The camera optical lens as described in claim 1, wherein the object side surface of the first lens is convex and the first lens further comprises a concave image side surface; the camera optical lens further satisfies the following conditions:

$$-2.91 \leq (R1+R2)/(R1-R2) \leq -0.76;$$

$$0.3 \text{ mm} \leq d1 \leq 0.97 \text{ mm};$$

where
R1: a curvature radius of the object side surface of the first lens;
R2: a curvature radius of the image side surface of the first lens;
d1: a thickness on-axis of the first lens.

4. The camera optical lens as described in claim 1, the camera optical lens further satisfies the following conditions:

$$-6.26 \leq f2/f \leq 1.97;$$

$$0.12 \text{ mm} \leq d3 \leq 0.41 \text{ mm};$$

where
f: the focal length of the camera optical lens;
f2: a focal length of the second lens;
d3: a thickness on-axis of the second lens.

5. The camera optical lens as described in claim 1, wherein the third lens has a concave object side surface and a concave image side surface; the camera optical lens further satisfies the following conditions:

$$-63.57 \leq f3/f \leq -1.09;$$

$$-49.42 \leq (R5+R6)/(R5-R6) \leq -4.05;$$

$$0.11 \text{ mm} \leq d5 \leq 0.51 \text{ mm};$$

where
f: the focal length of the camera optical lens;
f3: a focal length of the third lens;
R5: a curvature radius of the object side surface of the third lens;
R6: a curvature radius of the image side surface of the third lens;
d5: a thickness on-axis of the third lens.

6. The camera optical lens as described in claim 1, wherein the fourth lens includes a convex object side surface, and the camera optical lens further satisfies the following conditions:

$$-33.45 \leq f4/f \leq 2057.31;$$

$$-1.15 \leq (R7+R8)/(R7-R8) \leq 493.45;$$

$$0.25 \text{ mm} \leq d7 \leq 0.91 \text{ mm};$$

where
f: the focal length of the camera optical lens;
f4: a focal length of the fourth lens;
R7: a curvature radius of the object side surface of the fourth lens;
R8: a curvature radius of an image side surface of the fourth lens;
d7: the thickness on-axis of the fourth lens.

7. The camera optical lens as described in claim 1, wherein the fifth lens includes a convex image side surface; and the camera optical lens further satisfies the following conditions:

$$-19.07 \leq f5/f \leq 0.94;$$

$$0.43 \leq (R9+R10)/(R9-R10) \leq 1.71;$$

$$0.25 \text{ mm} \leq d9 \leq 0.94 \text{ mm};$$

where
f: the focal length of the camera optical lens;
f5: a focal length of the fifth lens;
R9: a curvature radius of an object side surface of the fifth lens;
R10: a curvature radius of the image side surface of the fifth lens;
d9: a thickness on-axis of the fifth lens.

8. The camera optical lens as described in claim 1, wherein the sixth lens has a concave object side surface; and the camera optical lens further satisfies the following conditions:

$$-7.73 \leq f6/f \leq -1.2;$$

$$-2.51 \leq (R11+R12)/(R11-R12) \leq -0.44;$$

$$0.13 \text{ mm} \leq d11 \leq 0.63 \text{ mm};$$

where
f: the focal length of the camera optical lens;
f6: a focal length of the sixth lens;
R11: a curvature radius of the object side surface of the sixth lens;
R12: a curvature radius of an image side surface of the sixth lens;
d11: a thickness on-axis of the sixth lens.

9. The camera optical lens as described in claim 1, wherein the object side surface of the seventh lens is concave and the image side surface of the seventh lens is concave; the camera optical lens further satisfies the following conditions:

$$-4.46 \leq f7/f \leq -0.47;$$

$$0.14 \text{ mm} \leq d13 \leq 0.64 \text{ mm};$$

where
f: the focal length of the camera optical lens;
f7: a focal length of the seventh lens;
d13: a thickness on-axis of the seventh lens.

10. The camera optical lens as described in claim 1, wherein the total distance from the object side surface of the first lens to an image surface along an optic axis TTL of the camera optical lens is less than or equal to 6.15 millimeters.

11. The camera optical lens as described in claim 1, wherein an F number of the camera optical lens is less than or equal to 1.83.

* * * * *